S. W. BABBITT.
Covered Article of Plated Ware.
No. 196,180. Patented Oct. 16, 1877.
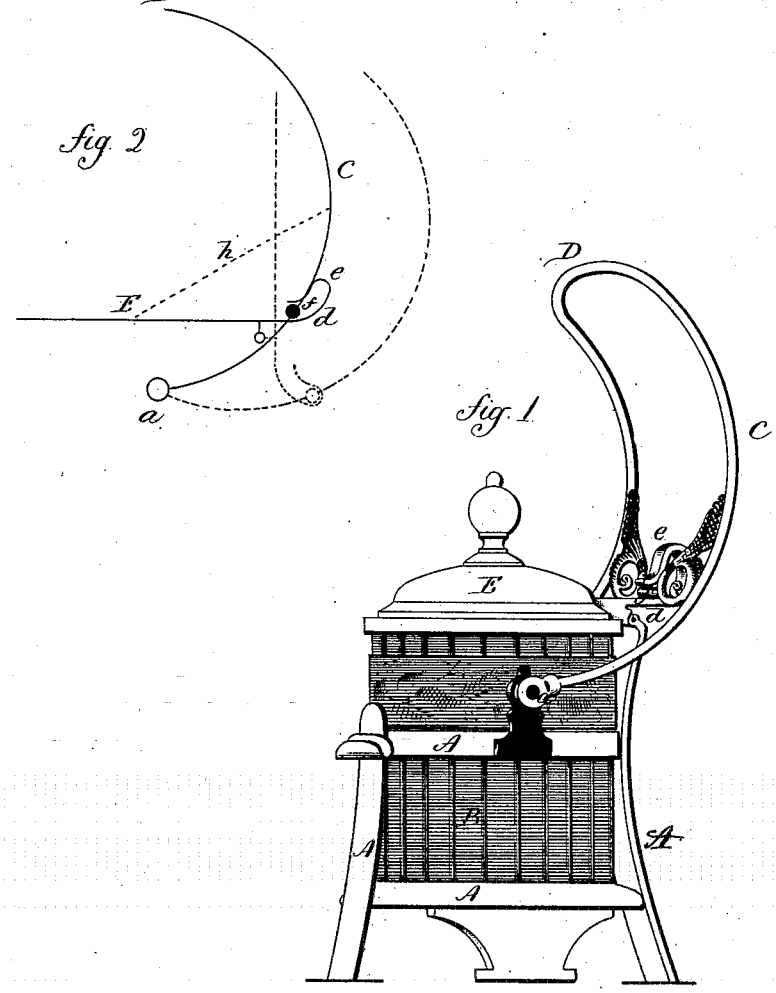

UNITED STATES PATENT OFFICE.

S. WILLIAM BABBITT, OF WEST MERIDEN, CONNECTICUT, ASSIGNOR TO WILCOX SILVER PLATE COMPANY, OF SAME PLACE.

IMPROVEMENT IN COVERED ARTICLES OF PLATED WARE.

Specification forming part of Letters Patent No. 196,180, dated October 16, 1877; application filed October 2, 1877.

*To all whom it may concern:*

Be it known that I, S. WM. BABBITT, of West Meriden, in the county of New Haven and State of Connecticut, have invented a new Improvement in Covered Articles of Plated Ware; and I do hereby declare the following, when taken in connection with the accompanying drawings, and the letters of reference marked thereon, to be a full, clear, and exact description of the same, and which said drawings constitute part of this specification, and represent, in—

Figure 1, perspective view; Fig. 2, diagram illustrating the operation.

This invention relates to an improvement in covered articles for table-service, such as pickle-jars, &c., in which the handle is of bail-shape, hinged to the supporting-frame, and extending above the cover, the object being to connect the bail with the cover, so as to automatically open or close the cover; and the invention consists in a bail hinged to the article below the cover, and extending up above, so as to form a bail-shaped handle, and connected with the cover between the handle proper and the hinge of the bail, so that, by turning the bail backward, the cover will be raised, as more fully hereinafter described.

The article of table-service here represented is a pickle-jar, which consists of a frame, A, of any desirable pattern, constructed to receive and hold the jar B. At opposite points on the frame, as at $a$, the bail C is hinged, and extends upward and over the cover, so that, taking hold at the top of the bail, the article may be raised, and carried in the usual manner for such articles. Preferably the bail is curved backward between the handle D and the hinge $a$. The cover E is hinged in the usual manner, and connected with the bail, as here represented, by an extension, $d$, rearward, the extension turning upward and forward, forming a hook shape, $e$, through which a bar, $f$, on the handle passes.

The operation of this construction is illustrated in Fig. 2. Raising the article by taking hold at D has no effect upon the cover, it being substantially the center of gravity of the article, and the article is raised and carried about in the usual manner for such articles. When desired to open the cover, the hand, still holding at D, presses backward, and the bar $f$ depresses the extension $d$ of the cover until the cover is opened, as indicated in broken lines, and when the handle is returned the cover will close, thus making the opening and closing of the cover automatic.

Instead of the projection $d$ and the bar $f$ a rod or flexible connection may be made between the cover and the handle, as indicated by the line $h$, Fig. 1, and the same result accomplished. The particular connection, therefore, between the cover and the bail is not essential.

It will be understood from the foregoing that this construction is applicable to other articles of table, toilet, or other service.

I claim—

In combination with the hinged cover, the bail-shaped handle, hinged below and extending above the cover, and the connection between the cover and the said handle, whereby the said handle may be used as a bail in carrying the article, and also as a means for opening the cover, substantially as specified.

S. WM. BABBITT.

Witnesses:
GEORGE A. FAY,
H. N. WATERS.